United States Patent
Tkachenko et al.

(10) Patent No.: US 9,934,657 B2
(45) Date of Patent: Apr. 3, 2018

(54) VENDING KIT AND METHOD

(71) Applicant: Pantry Retail, Inc., San Francisco, CA (US)

(72) Inventors: Artem Tkachenko, San Francisco, CA (US); Alexander Yancher, San Francisco, CA (US); Zhongning Chen, San Francisco, CA (US); Christopher Alika Ah New, San Francisco, CA (US)

(73) Assignee: Byte Foods, Inc., San Rafael, CA (US)

( * ) Notice: Subject to any disclaimer, the term of this patent is extended or adjusted under 35 U.S.C. 154(b) by 0 days.

(21) Appl. No.: 15/140,323

(22) Filed: Apr. 27, 2016

(65) Prior Publication Data

US 2017/0011384 A1    Jan. 12, 2017

Related U.S. Application Data

(63) Continuation of application No. 14/201,369, filed on Mar. 7, 2014, now Pat. No. 9,349,238.

(Continued)

(51) Int. Cl.
| | |
|---|---|
| *G06F 17/00* | (2006.01) |
| *G07G 1/00* | (2006.01) |
| *G07F 11/00* | (2006.01) |
| *G06Q 10/08* | (2012.01) |
| *G07F 11/02* | (2006.01) |
| *G06Q 30/02* | (2012.01) |
| *G07F 9/02* | (2006.01) |

(Continued)

(52) U.S. Cl.
CPC ........... *G07G 1/009* (2013.01); *G06Q 10/087* (2013.01); *G06Q 20/3278* (2013.01); *G06Q 30/0224* (2013.01); *G06Q 30/0237* (2013.01); *G07F 9/026* (2013.01); *G07F 11/002* (2013.01); *G07F 11/02* (2013.01); *G07F 11/38* (2013.01)

(58) Field of Classification Search
None
See application file for complete search history.

(56) References Cited

U.S. PATENT DOCUMENTS 7,262,698 B1 * 8/2007 Frederick ............. A61G 12/001
                                                              340/5.2
7,784,689 B2 * 8/2010 Linton ................. G07G 1/0045
                                                              235/385

(Continued)

*Primary Examiner* — Prasad V Gokhale
(74) *Attorney, Agent, or Firm* — Run8 Patent Group, LLC; Peter Miller

(57) ABSTRACT

One variation of a method for controlling access to products from a vending machine includes: locking a door of the vending machine; recording an initial inventory of products arranged within the vending machine based on signals received by a radio antenna arranged within the vending machine and read by a radio frequency identification reader; initiating a transaction in response to receiving a cashless payment mechanism from a patron; unlocking the door in response to authentication of the cashless payment mechanism; in response to closure of the door, recording a final inventory of products within the vending machine based on signals received by the radio antenna and read by the radio frequency identification reader; and initiating a payment with the cashless payment mechanism for a difference between the initial inventory and the final inventory to complete the transaction.

16 Claims, 6 Drawing Sheets

Related U.S. Application Data

(60) Provisional application No. 61/779,402, filed on Mar. 13, 2013, provisional application No. 61/779,818, filed on Mar. 13, 2013, provisional application No. 61/906,333, filed on Nov. 19, 2013.

(51) Int. Cl.
*G06Q 20/32* (2012.01)
*G07F 11/38* (2006.01)

(56) References Cited

U.S. PATENT DOCUMENTS

| | | | | |
|---|---|---|---|---|
| 8,041,453 B2 * | 10/2011 | Walker | | G06Q 10/087 235/378 |
| 2001/0056402 A1 * | 12/2001 | Ahuja | | G06Q 20/1085 705/43 |
| 2003/0004814 A1 * | 1/2003 | Roseen | | G06Q 10/087 705/22 |
| 2003/0034390 A1 * | 2/2003 | Linton | | G06Q 10/08 235/382 |
| 2004/0143368 A1 * | 7/2004 | May | | H04L 12/2803 700/241 |
| 2007/0175296 A1 * | 8/2007 | Subramanian | | B22F 1/0022 75/362 |
| 2008/0010191 A1 * | 1/2008 | Rackley, III | | G06Q 20/042 705/39 |
| 2008/0100416 A1 * | 5/2008 | Harper | | G06Q 10/00 340/5.7 |
| 2011/0067308 A1 * | 3/2011 | Hunt | | E05C 19/166 49/31 |
| 2012/0029690 A1 * | 2/2012 | Bruck | | G07F 9/10 700/232 |
| 2012/0067919 A1 * | 3/2012 | Cohen | | A47G 21/12 221/282 |
| 2012/0259778 A1 * | 10/2012 | Banerjee | | G06Q 20/10 705/43 |
| 2012/0296470 A1 * | 11/2012 | Saranow | | A45D 19/06 700/239 |
| 2013/0184856 A1 * | 7/2013 | Gregerson | | G07F 11/005 700/232 |
| 2013/0206835 A1 * | 8/2013 | Gazdzinski | | G06Q 10/08 235/380 |
| 2014/0297027 A1 * | 10/2014 | Tylenda | | G06F 19/327 700/237 |
| 2014/0316916 A1 * | 10/2014 | Hay | | G06Q 20/18 705/17 |

* cited by examiner

VENDING KIT AND METHOD

CROSS-REFERENCE TO RELATED APPLICATIONS

This application is a continuation application of U.S. patent application Ser. No. 14/201,369, filed on 7 Mar. 2014, which claims the benefit of U.S. Provisional Application No. 61/779,402, filed on 13 Mar. 2013, U.S. Provisional Application No. 61/779,818, filed on 13 Mar. 2013, and U.S. Provisional Application No. 61/906,333, filed on 19 Nov. 2013, all of which are incorporated herein in their entireties by this reference.

TECHNICAL FIELD

This invention relates generally to the field of vending machines, and more specifically to a new and useful vending kit for vending product in the field of vending machines.

DESCRIPTION OF THE PREFERRED EMBODIMENTS

The following description of embodiments of the invention is not intended to limit the invention to these embodiments, but rather to enable any person skilled in the art to make and use this invention.

1. Vending Kit

Figure 1:
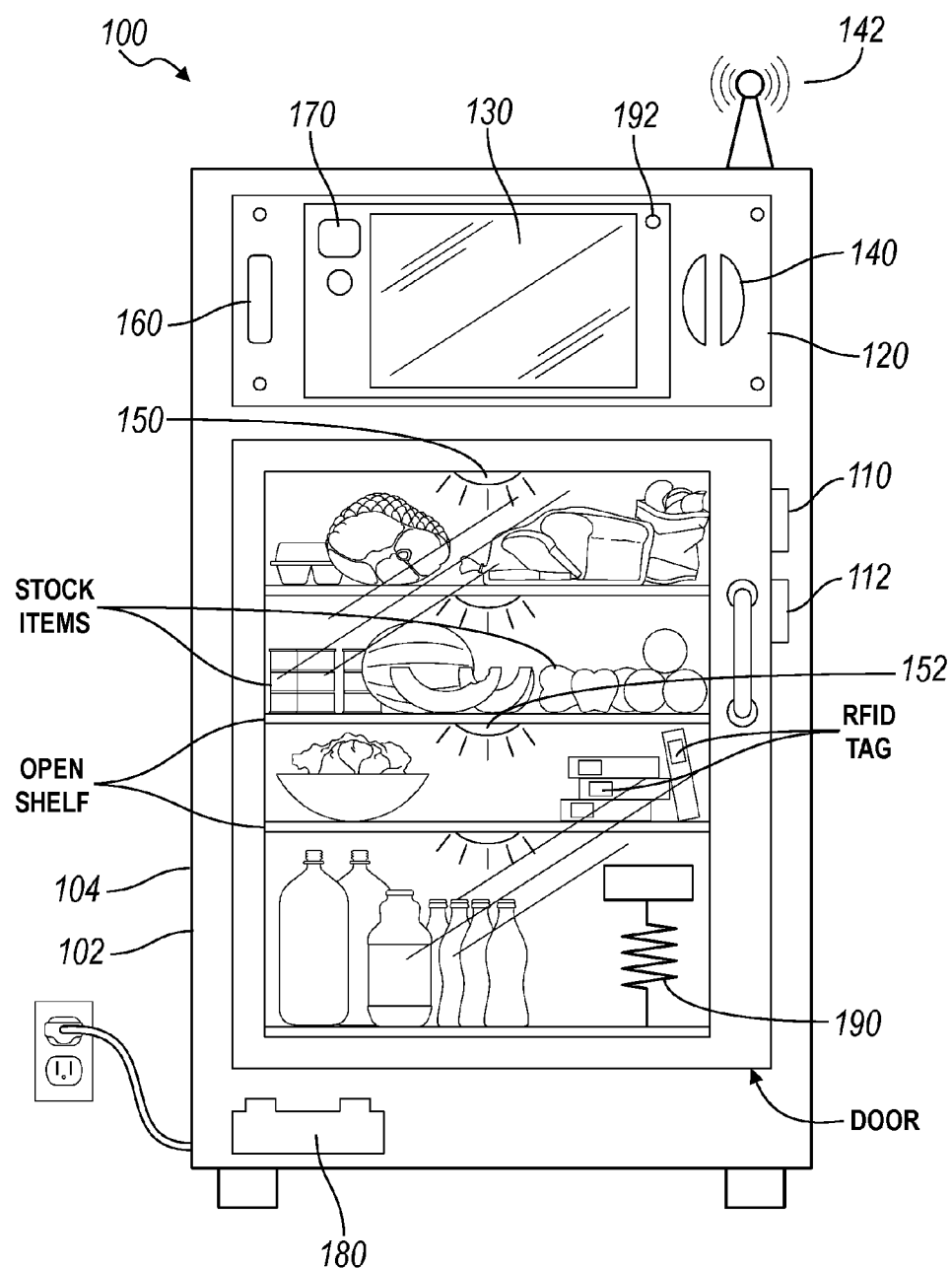
FIG. 1 is a schematic representation of a vending kit of one embodiment of the invention.

As shown in FIG. 1, a vending kit 100 for controlling access to products from a vending machine 102 includes: a locking mechanism 112 to be installed between a door of a kiosk and a casing of the kiosk; a door sensor 110; a housing 120 to be installed onto an external surface of the kiosk; a display 130 arranged within the housing 120 displaying pricing information for products within the kiosk; a payment collection module 140 coupled to the vending machine 102; a radio antenna 150 to be installed within the kiosk and to broadcast a signal toward radio frequency identification tags arranged on products within the kiosk; a radio frequency identification reader 160 arranged within the housing 120 and reading signals received from radio frequency identification tags via the radio antenna 150; and a processor 170 arranged within the housing 120, recording an initial inventory of products within the kiosk based on signals read by the radio frequency identification reader 160, authenticating a cashless payment mechanism received at the payment collection module 140, triggering the locking mechanism 112 to unlock the door in response to authentication of the cashless payment mechanism, recording a final inventory of products within the kiosk based on signals read by the radio frequency identification reader 160 in response to closure of the door detected at the door sensor 110, and initiating a payment with the cashless payment mechanism for a difference between the initial inventory and the final inventory.

Figure 3:
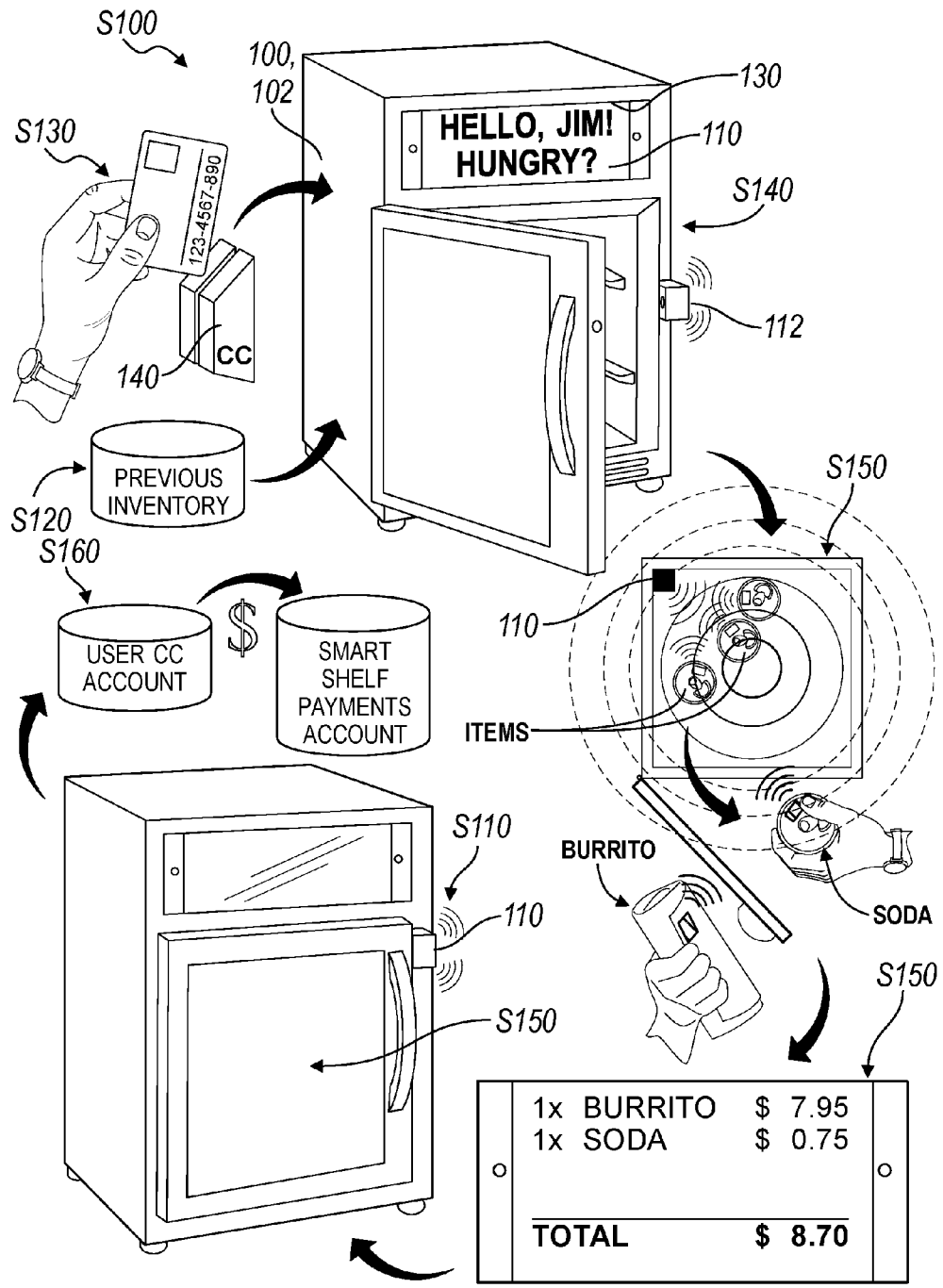
FIG. 3 is a flowchart representation of a method of one embodiment of the invention.
Figure 5A:
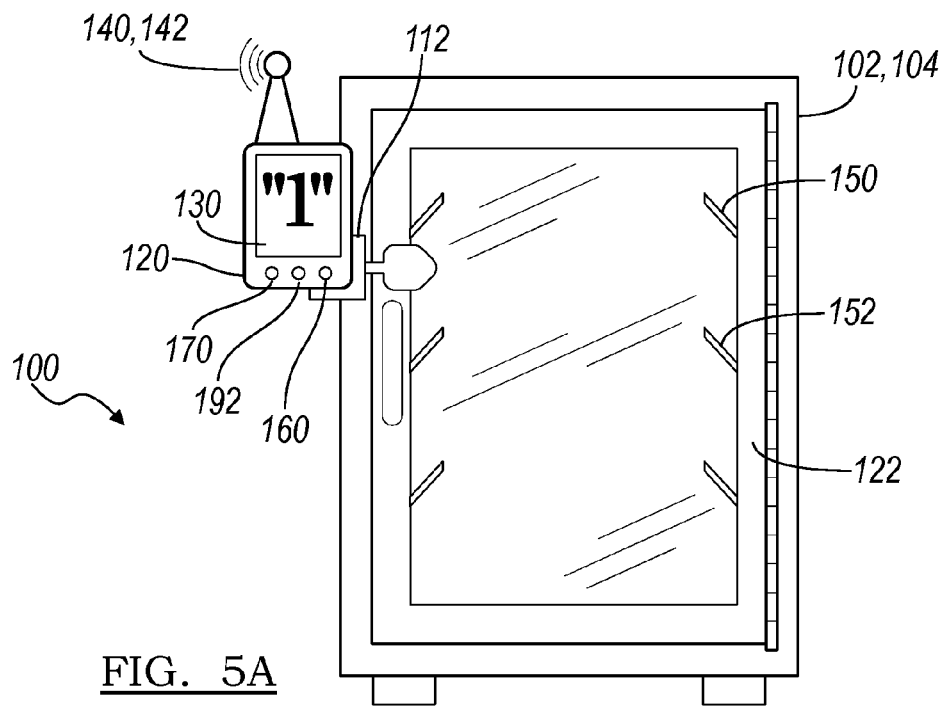
FIGS. 5A and 5B are a schematic representations of one variation of the vending kit.

As shown in FIGS. 3 and 5A, one variation of the vending kit 100 includes: a locking mechanism 112 installed between a door of the kiosk and a casing of the kiosk; a door sensor 110 detecting a state of the door; a radio antenna 150 broadcasting a signal toward radio frequency identification tags arranged on products within the kiosk; a radio frequency identification reader 160 and reading identification signals received from radio frequency identification tags via the radio antenna 150; a wireless communication module 142 and transmitting product data to a mobile computing device proximal the kiosk for presentation to a patron; and a processor 170 recording an initial inventory of products within the kiosk based on signals read by the radio frequency identification reader 160, initiating, through the wireless communication module, a transaction with a cashless payment mechanism associated with the mobile computing device, triggering the locking mechanism 112 to unlock the locking mechanism 112 in response to initiation of the transaction, recording a final inventory of products within the kiosk based on signals read by the radio frequency identification reader 160 in response to closure of the door detected at the door sensor 110, and initiating a payment with the cashless payment mechanism for a difference between the initial inventory and the final inventory.

The vending kit 100 enables vending of one or more products of various sizes, types, form factors, etc. from a vending machine 102 within a single transaction without requiring specialized dispensary modules, mechanisms, or vending machines. Generally, the vending kit 100 can be installed on or within an existing vending machine 102, refrigerator vessel (e.g., a refrigerator), food kiosk, enclosed pantry, etc. (hereinafter a "kiosk") to transform the container into a 'smart' vending machine 102 through which a patron may provide a billing mechanism, remove any number of foodstuffs or other items, and be billed automatically for what was removed without further input. In particular, the vending kit 100 can be installed on or in a container that includes one or more open shelves upon which various products (i.e., foodstuffs) can be placed, the products each including a tag wirelessly detectable by the vending kit 100 to check inventory within the container. The vending kit 100 also controls access to products within the container by setting a state of a door lock on the container and then handles compensation for foodstuffs selected by a patron by initiating payment for the foodstuffs with a cashless payment mechanism entered by the patron when the door of the container transitions from an open state—during which products are removed from the container—to a closed state.

In one implementation shown in FIG. 1, components of the vending kit 100—such as the locking mechanism 112, the door sensor 110, the housing 120, the display 130, the payment collection module 140, the radio antenna 150, the radio frequency identification (RFID) reader, and the processor 170—are bundled into a kit to retrofit onto an existing shelving unit, display case, refrigerator, or other product storage unit including a shelf and door. For example, the kit can be installed on an existing refrigerator to repurpose the refrigerator as a vending machine 102 through which patrons can retrieve food items from the refrigerator and pay for their selections accordingly. In this example, the door sensor 110, the display 130, the payment collection module 140, the radio frequency identification (RFID) reader, and the processor 170 can be integrated into the housing 120, and the housing 120 can be installed onto an exterior surface of the refrigerator (e.g., on an outer surface of the door of the refrigerator), the locking mechanism 112 can be installed between the door and the door frame of the refrigerator, and the radio antenna 150 can be installed over a shelf within the refrigerator. The components of the vending kit 100 can thus be installed on the exterior of the vending machine 102 and/or inside of the vending machine 102, such as within a food storage area of the vending machine 102. For example, the housing 120 can be installed on an interior surface of a transparent (e.g., glass) area of the door of the vending machine 102 with the display 130 displaying images through the door, and a lock receiver of the locking mechanism 112 can be installed on an adjacent interior wall of the vending machine 102.

In a similar implementation shown in FIG. 5A, the locking mechanism 112, the door sensor 110, the display 130, the payment collection module 140, the radio antenna 150, the radio frequency identification (RFID) reader, and the processor 170 of the vending kit 100 are integrated into a replacement door 122 for an existing refrigerator. Thus, in this implementation, the replacement door 122 can be installed in unit onto the existing refrigerator to upgrade the refrigerator with the functionalities described herein.

In yet another implementation shown in FIG. 3, the vending kit 100 is integrated into a refrigerated container as an original-equipment manufacture (OEM) vending machine 102 exhibiting the functionalities described herein. However, the vending kit 100 can be installed onto or integrated into a container in any other way to enable any of the vending functionalities described herein. Hereinafter, unless stated or implied otherwise, "vending machine 102" shall refer to the assembly of a container—such as a refrigerator—with the vending kit 100 installed.

In these implementation, components of the vending kit 100 can be discrete and assembled into the vending kit 100, such as with the processor 170, the display 130, the RFID reader 160, and the payment collection module 140 arranged within the housing 120 and with the RFID antenna connected to the RFID reader 160 by a coaxial cable. Additionally or alternatively, components of the vending kit 100 can be pre-packaged as a mobile computing device, such as a tablet or a smartphone that includes a wireless communication module, a camera 192, the processor 170, and the display 130 and that is connected to the payment collection module 140 and to the RFID reader 160 via wired connections.

The vending kit 100 can vend one or more types or categories of products, such as fresh food, prepackaged food, fresh or prepackaged drinks, peripheral electronic devices, jewelry items, clothing, shoes, janitorial items, etc.

2. Applications

In one application, the vending kit 100 is installed into a food-vending kiosk (i.e., assembled into "vending machine 102") stocked with freshly-prepared food items from local café s and restaurants. In this application, boxed salads in various sizes, boxed or wrapped sandwiches and burritos, boxed or bottled drinks, and/or condiments, etc. can all be stacked or otherwise arranged on one or more open shelves within the vending machine 102. For example, a patron can swipe a credit card through a credit card reader coupled to the processor 170 or log into a purchase account via the display 130 that includes a touchscreen, and the processor 170 can trigger the locking mechanism 112 to unlock the door in response to validation of the credit card or successful login into a purchase account. The patron can subsequently open the door of the vending machine 102, select one or more food items, and close the door. Once the door is closed, the RFID reader 160 can poll RFID tags still within the vending machine 102, and the processor 170 can compare a new set of returned tag values (i.e., a current) inventory to a previous set of returned tag values (i.e., a previous) inventory to identify one or more food items removed from the shelf. The processor 170 can thus initiate a single transaction to bill the patron's payment mechanism for all removed items. Thus, in this application, the vending machine 102 can be arranged in an office as an alternative to an on-campus cafeteria or an off-campus restaurant, outside a café as an alternative to waiting in line for a sandwich, or in any other setting to supply food to local patrons on the fly.

In another application, the vending kit 100 is installed into an office supply-vending kiosk stocked with computer mice, keyboards, pens, pencils, reams of paper, boxes of staples, phone charges, computer chargers, and/or sticky notes, etc. on one or more open shelves. Like the application described above, products can be stacked onto one or more shelves without guides or specialized dispensing mechanisms within the vending machine 102. Rather, the processor 170 can trigger the locking mechanism 112 to unlock the door once a patron is identified and/or a payment method is provided, identify inventory changes on the shelves based on poll results collected at the RFID reader 160 regardless of product placement or arrangement within the vending machine 102, and bill the patron according to items identified as removed from the vending machine 102 once the door is closed (or once another transaction-completion event is detected). Additionally or alternatively, the vending machine 102 can authenticate or identify the patron, enable the patron to take and/or return stocked items, and update an inventory ledger accordingly.

In yet another application, the vending machine 102 is stocked with paper newspapers for purchase, paper novels or other printed literature for purchase, CDs or DVDs for rent or purchase, or prepackaged foods (e.g., chips, canned drinks). The vending machine 102 can also be stocked with mixed media, such as both food and books, which can be arranged on the same or different shelves within the vending machine 102. The vending machine 102 can also be installed in an office environment, an unrelated retail outlet, a grocery store, a café or restaurant, or an airport. However, the vending machine 102 can be arranged or installed in any other suitable environment and stocked with any other suitable product, media, or consumable for rent or purchase.

3. Kiosk

As described above, the vending kit 100 can be installed onto an existing kiosk or integrated into a new kiosk enclosing one or more shelves behind a door. The kiosk can be a freestanding (e.g., floor) kiosk, an installed unit (shown in FIG. 1), a tabletop unit, wall-hanging unit, or of any other form arranged in a space in any other way. The door of the kiosk can include a transparent window to enable a patron proximal the vending machine 102 (i.e., the kiosk with installed vending kit 100) to visually discern items within the vending machine 102, as shown in FIG. 1. For example, the door can be a double-paned safety-glass door that is vertically hinged to the body of the kiosk on one side, and the door can include a handle on an opposite side of the door.

The kiosk can be sized for one or more open shelves that hold product of a maximum height and/or width dimension. For example, the kiosk can support open shelves spaced vertically by twelve inches, thus enabling a 20 oz. soda bottle to be stored on a lower shelf of the kiosk and then comfortably removed by a patron. The kiosk can be insulated and heated and/or cooled to enable safekeeping of perishable food items. For example, the kiosk can include two open shelves separated by an insulated barrier, wherein one shelf is heated to maintain hot foodstuffs (e.g., soup, burritos) at a target hot consumption temperature, and the second shelf can be cooled to maintain cold foodstuffs (e.g., fruit, cold sandwiches) at a target cold consumption temperature.

The shelf of the kiosk can define an open structure that supports products of various form factors. In one implementation, the shelf defines a flat shelf without partitions permanently or transiently arranged within the interior of the kiosk. In this implementation, the shelf can thus simultaneously support multiple items of different (or unique) sizes, forms, or packaging and enable quick exchange of items of different form factors without necessitating reconfiguration of partitions within the kiosk. For example, the shelf can omit a coil-based dispenser commonly used to dispense candy bars in a kiosk, and instead, on one day, a box of candy bars can be placed on one side of the shelf adjacent a stack of fresh salads and bowls of fresh fruit in compostable containers, and the box of candy bars can be moved to an other side of the shelf to make room for a box of single-serving yogurt cups on the next day.

In another implementation, the shelf is assigned to an item of common type or packaging, such as soda in standard 12 oz. aluminum cans, and the shelf includes one or more guides to aid placement of items into the vending machine 102. In one example, the shelf includes decals or lighted regions demarcating preferred placement of soda cans on the shelf. In another example, the kiosk includes shallow cups or ridges that fit the bottom of soda cans, wherein the cups physically retain cans in an organized fashion on the shelf. As in the foregoing examples, the shelf can similarly define visual and/or physical guides to aid organization of single-serving yogurt cups, cups of coffee, or cups of soup on the shelf. In this implementation, the shelf can still support items loaded into the vending machine 102 without deference to visual indicators applied to the shelf as well as items placed on, over, and/or around physical guides. Therefore, in this implementation, the shelf can provide moderate physical or visual guidance to loading product (i.e., foodstuffs) onto the vending machine 102.

In the foregoing implementation in which the shelf includes features to guide placement of items of known size, shape, and/or packaging, the vending kit 100 can further include a sensor arranged on or within the shelf to detect placement and/or removal an item from the shelf. In one example implementation, the vending kit 100 includes a RFID tag arranged on the shelf adjacent a region of the shelf allocated for an item with metallic packaging, such as an aluminum soda can or a burrito wrapped in aluminum foil. In this example implementation, the radio antenna 150 and the RFID reader 160 can cooperate to determine that a corresponding product has been placed on a designated area of the shelf when the RFID reader 160 does not detect a corresponding RFID tag—that is, when the metallic packaging placed on the shelf blocks wireless communication between the radio antenna 150 and the RFID tag. In this example implementation, the processor 170 can thus determine that the corresponding product has been removed from the shelf when the radio antenna 150 and the RFID reader 160 can again detect the RFID tag, since removal of the item may enable a signal from the radio antenna 150 to reach the RFID tag and a signal thus transmitted by the RFID tag may thus reach the radio antenna iso. In this implementation, an RFID tag can be similarly applied to a shelf or other area within the vending machine 102 such that a product—even without metallic packaging—shields a corresponding RFID tag. For example, a (plastic) bottle of water can be arranged on a shelf within the vending machine 102 and between the radio antenna 150 and the RFID tag such that water in the bottle shields the RFID tag from a signal transmitted from the radio antenna.

The vending kit 100 can additionally or alternatively include a capacitive or optical proximity sensor arranged on or in a particular region of the shelf allocated for an item, and the processor 170 can poll the proximity sensor to determine if an item is arranged in the particular region. Similarly, the vending kit 100 can include a camera or other optical sensor that images all or a portion of the shelf, and the processor 170 can implement machine vision and/or machine learning techniques to identify items placed on and/or removed from the shelf. In this implementation, the camera or optical sensor can be coupled to an interior surface of the kiosk or arranged within the housing 120 and define a field of view that includes at least a portion of the shelf.

The shelf can also be adjustable within the kiosk, thereby enabling manual redistribution of product holding areas with the vending machine 102. For example, a supplier may occasionally place larger and/or oddly-shaped items within the vending machine 102 by moving the shelf. However, the shelf can be arranged in the kiosk (or vending machine 102) in any other way and can include any other suitable feature or component.

4. Housing

The housing 120 of the vending kit 100 is configured for installation on an external surface of the kiosk. Generally, the housing 120 functions to contain various components of the vending kit 100—such as the processor 170, the display 130, the RFID reader 160, and/or the payment collection module 140—and to retrofit onto an external surface of a casing of the kiosk (e.g., a refrigerator). For example, as in the application of the vending kit 100 as an aftermarket upgrade for an existing refrigerator described above, the housing 120 can be installed over an external surface of a door of the refrigerator with a tamperproof fastener. Similarly, as in the application of the vending kit 100 as a replacement door 122 for an existing refrigerator described above, the housing 120 can include a replacement door 122 for the refrigerator. Thus, when the vending kit 100 is in operation, the housing 120 is installed onto the kiosk to define a ('smart') vending machine 102.

In one implementation of the vending kit 100 as an aftermarket upgrade kit, the housing 120 contains the radio antenna 150, the RFID reader 160, the processor 170, and the display 130 (e.g., a touchscreen), and/or the payment collection module 140, etc., and the housing 120 defines a set of mounting locations (e.g., through-holes) that accept tamper-proof self-tapping sheet metal screws to mount the housing 120 over a surface of the kiosk, such as over a corner of a door of the kiosk opposite a hinged side of the door of the kiosk. Alternatively, the housing 120 can be substantially permanently (i.e., non-transiently) installed on the kiosk, such as with an adhesive (e.g., epoxy) or other adhesive or chemical fastener.

In another implementation, the housing 120 includes a mounting plate that is first installed on a side of the kiosk, such as with any of the foregoing methods or fasteners, and the housing 120 is then installed over the mounting plate. In this implementation, the mounting plate can include electrical pin contacts electrically coupled to various other components and power sources within the vending machine 102. For example, the radio antenna 150 can be electrically coupled to a connector at the mounting plate, the locking mechanism 112 can be electrically coupled to a power control pin at the mounting plate, and an electrical power tap connected to a regulated power line within the kiosk can be electrically coupled to ground and power source pins at the mounting plate. Thus, in this example, when the housing 120 is installed over the mounting plate, the pins on the housing 120 electrically coupled to the processor 170, to the RFID reader 160, etc. can contact the foregoing pins in the mounting plate to collect RFID signals through the radio antenna 150, to control the locking mechanism 112, and to source power for the vending kit 100, respectively. The housing 120 can further lock to the mounting plate, such as with a mechanical lock with key, to prevent tampering of fasteners that retain the mounting plate to the kiosk and that lie behind the installed housing.

In the application of the vending kit 100 that is installed over existing product storage containers, the vending kit 100 can be also reconfigurable for installation on both refrigerators with left-hinging doors and refrigerators with right-hinging doors. For example, the locking mechanism 112 can be configured for installation on a door of a refrigerator, and the housing 120 of the vending kit 100 can be configured for installation on an exterior casing of the refrigerator adjacent the door such that the housing 120 (with the display 130 and other components of the vending kit 100) is flipped vertically between left-hinging installations (shown in FIG. 5B) and right-hinging installations (shown in FIG. 5A). In this example, the vending kit 100 can also include a tilt sensor that detects the orientation of the housing 120 (and therefore the configuration of the refrigerator) once the vending kit 100 is installed and powered ON. The processor 170 can thus control the display 130 to render customer prompts, billing information, item pricing, real-time discounts, current inventory, etc. in a legible orientation based on the detected orientation of the installed housing.

The processor 170 can similarly implement the detected orientation of the installed housing and/or positions of the radio antenna 150 retrofit into the refrigerator to determine positions of food items within the vending machine 102 based on RFID signal strengths received by the RFID reader 160. For example, the processor 170 can determine that the vending machine 102 is in a first vertical orientation based on an output of an accelerometer within the housing 120, correlate this first vertical orientation with installation on the right side of a vending machine 102 door (i.e., on a left-hinging door), and thus determine that detected food items to the left rear of the housing 120 are inside of the vending machine 102 and that detected food items to the right rear of the housing 120 are outside of the vending machine 102. In this example, a processor in another vending kit 100 installed on a similar refrigerator can determine that its housing is in a second vertical orientation (180° from the first vertical orientation), correlate this second vertical orientation with installation on the left side of the refrigerator door (i.e., a right-hinging door), and thus determine that detected food items to the right rear of the housing 120 are inside of the vending machine 102 and that detected food items to the left rear of the housing 120 are outside of the vending machine 102. However, the vending kit 100 can function in any other way to detect a position of the installed vending kit 100 and implement the detected position in any other way.

Furthermore, because refrigerators, storage kiosks, and other preexisting containers can be of various shapes and sizes, the housing 120 can be configured for installation onto various positions on existing product storage containers, such as at various heights along a left side of a tall (e.g., six-foot-tall) refrigerator with a right-hinged door, at a top-right corner of a low (e.g., four-foot-tall) refrigerator with a left-hinged door, or near a top-center of a refrigerator with double (e.g., French) hinged doors.

Figure 6:
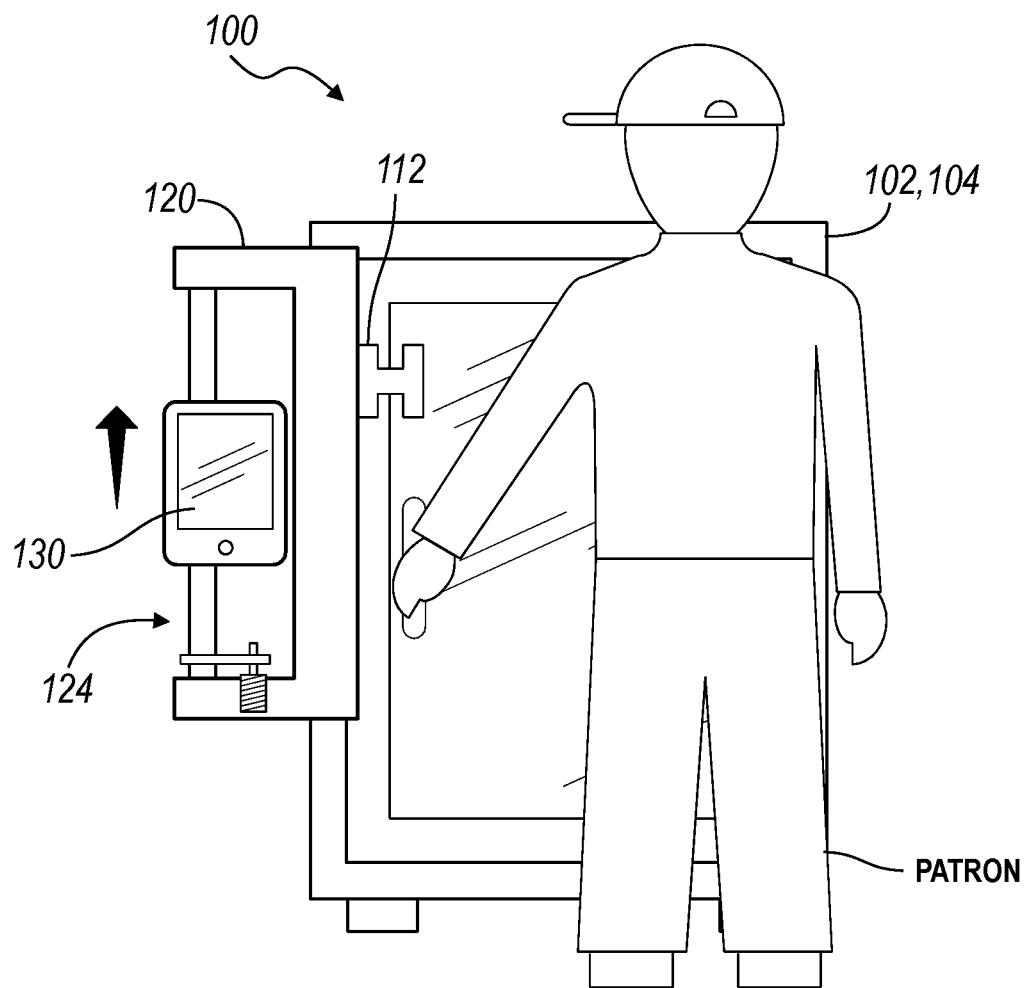
FIG. 6 is a schematic representation of one variation of the vending kit.

Patrons can also be of various heights. Therefore, as shown in FIG. 6, one variation of the vending kit 100 further includes an actuator 124 that modifies a position or orientation of the housing 120 to improve customer access to the display 130 (or to the touchscreen). For example, the processor 170 can implement eye-tracking techniques to analyze frames of a video feed from a forward facing camera 192 adjacent the display 130 and thus determine a preferred position of the housing 120 to enable visual (and tactile) access to the display 130 (or the touchscreen) by current patron. The processor 170 can then output a corresponding position command to the actuator 124, and the actuator 124 can implement the position command to move the housing 120 and/or the display 130. In one implementation, the actuator 124 moves the display 130 (e.g., the processor 170 along a vertical track to bring the center of a display area of the display 130 in-line with the patron's eyes (at least within a throw of the actuator 124), as shown in FIG. 6. The actuator 124 can additionally or alternatively tilt the display 130 to reduce the customer's viewing angle to the display 130—that is an angle between the line of sight from the customer's eyes to the center of the display 130 and a normal vector of the surface of the display 130). However, the processor 170 can determine a preferred position of the display 130 in any other way, and the actuator 124 can function in any other way to adjust the position of the display 130 accordingly.

5. Locking Mechanism

The locking mechanism 112 of the vending kit 100 is configured for installation between a door of a kiosk and a casing of the kiosk. Thus, wherein the vending kit 100 is in operation, the locking mechanism 112 is coupled to the housing 120 and installed between the door of the kiosk and the casing of the kiosk. Generally, the locking mechanism 112 functions to control access to products inside the vending machine 102 by intermittently locking and unlocking the door based on a control signal from the processor 170.

In one implementation, the locking mechanism 112 includes an electromagnetic lock. In this implementation, the locking mechanism 112 includes an armature plate configured for mechanical installation onto a case of the kiosk (e.g., a refrigerator). In this implementation, the locking mechanism 112 also includes an electromagnet configured for mechanical installation onto the door of the kiosk, to retain the armature plate in a steady-state mode, and to release the armature plate in response to receiving an unlock command from the processor 170. Thus, in this implementation, the processor 170 can trigger a relay to supply current to the electromagnet to induce a magnetic field that draws the armature plate toward the electromagnet and then retains the armature plate against electromagnet. Alternatively, the armature plate can be coupled to the door, and the electromagnet can be coupled to the case of the kiosk. The locking mechanism 112 can include any other suitable type of electromagnetic lock arranged in any other suitable way.

The locking mechanism 112 can alternatively include an electromechanical lock, such as solenoid-type lock, and the processor 170 can control access to the interior space of the vending machine 102 by transmitting signals to the electromechanical lock to lock and/or unlock the door. For example, the locking mechanism 112 can include a lock bolt and a receiver, receiver mounted inside the case of the kiosk, and the lock bolt mounted on an interior face of the door and driven into the receiver by a solenoid controlled by the processor 170. In a similar example, the receiver can be mounted to an exterior surface of the kiosk case, and the lock bolt and solenoid can be arranged within the housing 120 with the solenoid driving the lock bolt out of the housing 120 and into the receiver to lock the door in response to a signal from the processor 170. In another similar example in which the housing 120 defines a replacement door 122 for the kiosk, the locking mechanism 112 can include a lock bolt integrated into the replacement door 122 and a receiver configured for mounting on the kiosk case in alignment with the lock bolt.

Yet alternatively, the locking mechanism 112 can directly engage an existing feature on the door, a doorframe, or an other feature on the kiosk, such as instead of a lock receiver or armature plate.

Similar methods and fasteners described above to install the housing 120 onto the kiosk can be implemented to install components of the locking mechanism 112 onto the door and/or onto the case of the kiosk. For example, the locking mechanism 112 can be installed with bolts, standard or tamper-proof screws, or any other suitable mechanical fastener. The locking mechanism 112 can also include a tamper-proof or lockable cover over one or more mechanical fasteners to prevent access thereto and thus deter removal of the lock mechanism by other than an authorized user (e.g., a technician).

6. Door Sensor

The door sensor 110 of the vending kit 100 detects a state of the door of the vending machine 102. Thus, when the vending kit 100 is in operation, the door sensor 110 detects a state of the door—such as if the door is open, closed, closed and unlocked, and/or closed and locked—and communicates the door state and/or a change in door state to the processor 170.

The door sensor no can include an electromechanical contact switch, an optical sensor, a capacitive sensor, a magnetic (e.g., Hall effect) sensor, an angle sensor (e.g., arranged on a door hinge), a reed switch, or an other suitable type of sensor that detects a state of the door.

In one implementation, the door sensor no and the locking mechanism 112 are physically coextensive. For example, the door sensor 110 can be integrated into the electromagnetic lock, detect a change in magnetic flux at the electromagnet corresponding to transition of the door from the open state to a closed state, and then communicate the detected door change state to the processor 170. The door sensor no can similarly detect proximity of the armature plate to the electromagnet and transmit this detected proximity—such as in analog distance form or in binary (e.g., open or closed) form—to the processor 170. Alternatively, the door sensor no can include a magnetic bond sensor that detects that outputs a signal corresponding to whether or not the locking mechanism is locked.

However, the door sensor no can be any other suitable type of sensor, can be arranged in any other suitable way, and can function in any other way to detect a state of the door.

7. Radio Antenna and RFID Reader

The radio antenna 150 of the vending kit 100 is configured for installation within the kiosk and to broadcast a power signal toward radio frequency identification tags arranged on products within the kiosk. Thus, when the vending kit 100 is in operation, the radio antenna 150 broadcasts a signal toward radio frequency identification tags arranged on products within the kiosk. The radio frequency identification reader 160 of the vending kit 100 can be arranged within the housing 120 and reads signals received from radio frequency identification tags via the radio antenna 150. Thus, when the vending kit 100 is in operation, the radio frequency identification reader 160 reads (e.g., processes) signals received—via the radio antenna 150—from radio frequency identification tags arranged on products within the vending machine 102.

Generally, the RFID reader 160 and the radio antenna 150 cooperate to retrieve data from a radio frequency identification tag coupled to packaging of a product arranged within the vending machine 102. In particular, the RFID reader 160 transmits a signal to the radio antenna 150, which wirelessly broadcasts this signal in the form of electromagnetic radiation to the interior volume of the vending machine 102. RFID tags arranged on products within the vending machine 102 harvest power from this electromagnetic radiation and broadcast unique codes. The radio antenna 150 wirelessly receives (all or a portion of) these unique codes, which are collected and read (i.e., converted into a machine-readable format) by the RFID reader 160. The processor 170 can then receive the unique codes received from the RFID tags and converted by the RFID reader 160 to inventory products within the vending machine 102.

Figure 2:
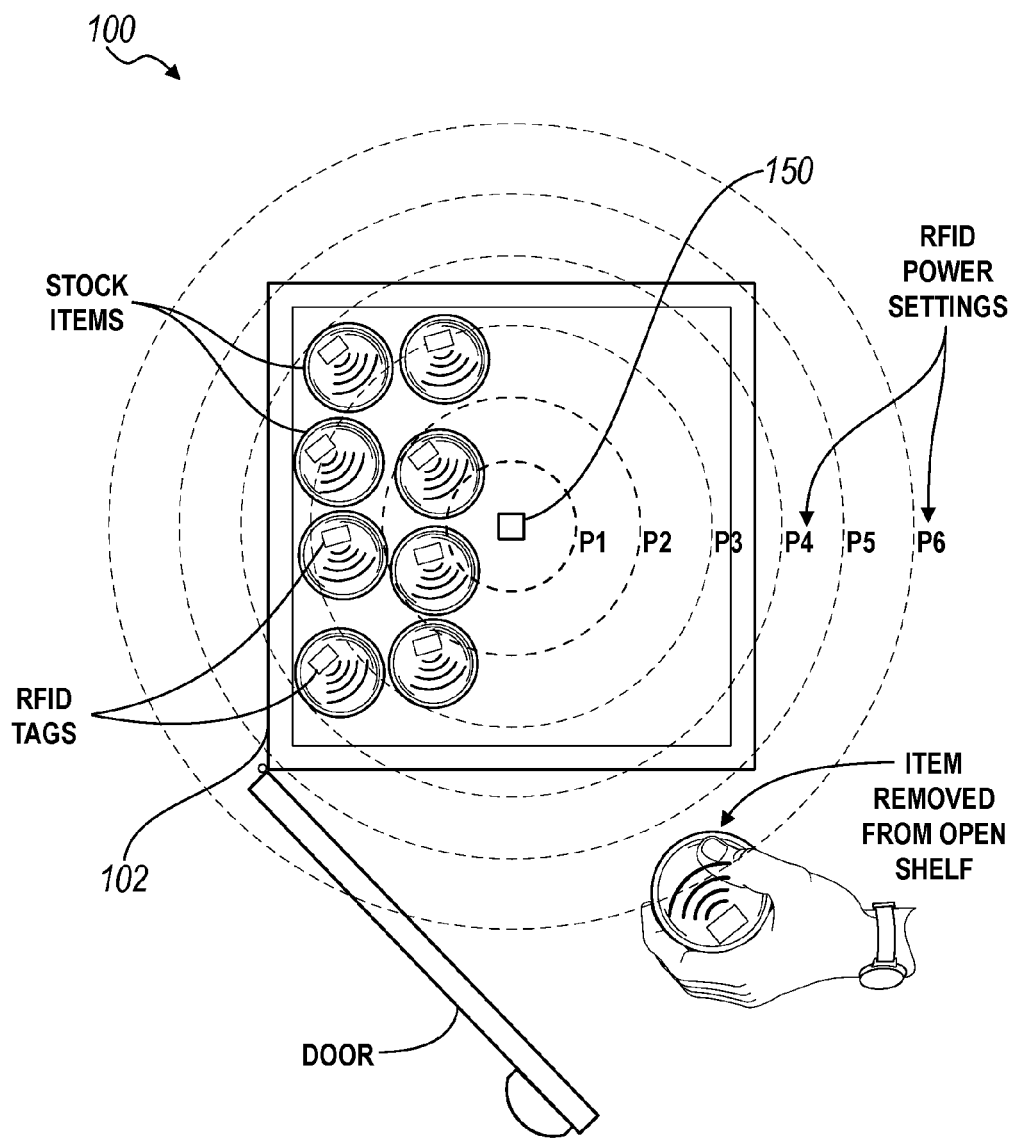
FIG. 2 is a schematic representation of one variation of the vending kit.

Therefore, each item placed in the vending machine 102 can be physically labeled with a RFID tag, as shown in FIG. 2. In particular, a RFID tag arranged on an item can output a substantially unique signal when powered, such as a unique serial number or a common product type ID followed by a unique serial number. In one example, a RFID tag applied to the packaging of a first fresh burrito can output the numerical sequence "10027-000857," wherein "10027" is a stock-keeping unit (SKU) number assigned to a veggie burrito with medium salsa from a particular vendor, and wherein "000857" is a unique serial number assigned to the particular RFID tag. In this example, the kiosk can thus discern between a first fresh burrito and a similar fresh burrito (e.g., with RFID tag that outputs "10027-0010791") in the vending machine 102 based on unique serial numbers assigned to respective RFID tags.

Details of a particular item can be previously assigned to a corresponding RFID tag and stored in a database for subsequent access by the processor 170, such as when the particular item is placed in the vending machine 102 and later removed during a transaction with a patron. As in the example above in which the RFID tag outputs both a common product ID and a unique serial number and as shown in FIG. 3, the common product ID can be linked to a product description (e.g., "veggie burrito from Antonio's Tacos, medium salsa"), an initial or current price product (e.g., $7.50), a product shelf life (e.g., twenty-four hours), nutritional content of the product (e.g., calories, carbohydrates), product ingredients (e.g., flour tortilla, black beans, rice, etc.), potential food allergens (e.g., "This product contains gluten," "This product may contain traces of peanuts"), etc.

In another example, when a user loads an item into the kiosk, the individual can interface with the processor 170 (e.g., via the display 130 or touchscreen) to select details of the item from a menu of available item details or to manually enter item details. In this example, the user can then interface with the radio antenna 150 and the RFID reader 160 to scan a RFID tag—coded with a unique numerical output (e.g., serial number)—on the item packaging to associate the unique numerical output with the selected or entered details of the item. The processor 170 can then store the selected or entered product details in a current inventory database with the unique output of the RFID tag. In yet another example, a RFID tag can be directly coded with item details, and the radio antenna 150 and the RFID reader 160 can cooperate to download a price, ingredients, and/or nutritional content etc. of an item directly from the RFID tag arranged on the item. However, an RFID tag can be linked to and/or store data pertaining to a particular item in any other suitable way.

In one implementation, a RFID tag is assembled into a tamper-proof sticker that is subsequently applied (e.g., manually) to packaging on an item prior to placement on the shelf in the kiosk. In this implementation, the sticker can self-destruct (e.g., tear) if removal from the product packaging is attempted, thus deterring thefts by preventing a patron from selecting a product, removing the RFID tag from the product packing, and returning the RFID tag to the shelf without the corresponding product. In this implementation, the sticker also be used to tape packaging around the item closed such that the item cannot be removed from the packaging without destroying the RFID tag, thereby deterring a patron from returning the RFID tag and the packaging to the vending machine 102 to avoid payment for the item.

Alternatively, the RFID tag can be arranged in a multi-use sticker that can be removed and applied to multiple product packages over time, thus enabling reuse and recycling of the RFID tag. For example, the RFID tag can be arranged in an electrostatic sticker that can me removed from one used packaging and replaced onto a new packaging.

In another implementation, the RFID tag is incorporated directly into product packaging, such as integrated into a hinged plastic single-use food container or integrated into a paper sandwich bag. The RFID tag can also be incorporated into a rubber band, a tie, a bow, a ribbon, tape, or an other fastener that holds packaging around a product.

The RFID tag can also be configured for particular arrangement on product packaging such that the radio antenna 150 can read the RFID tag when the product is loaded into the vending machine 102, such as regardless of orientation of the product and of other products adjacent the product on the shelf. For example, the RFID tag can be integrated into a molded clamp or sticker that holds a disposable clamshell food box closed such that the RFID tag can only be arranged on a side of the product packaging and not against the shelf when stored in the vending machine 102. Furthermore, in this example, communications between the RFID tag and the radio antenna 150 can remain substantially unobstructed when similar product packages are stacked on top of and/or adjacent the product. However, the RFID tag can be of any other form and can couple to an item or item packaging in any other suitable way.

The radio antenna 150 can detect (i.e., to power and then receive a wireless signal from) multiple RFID tags arranged on corresponding items placed on one or more shelves within the vending machine 102. In one configuration, the radio antenna 150 is arranged on or over the shelf. For example, the radio antenna 150 can be suspended from (the center of) a second shelf above and configured to poll RFID tags on items arranged on the shelf below. In this example, the radio antenna 150 can include a right-hand circular polarized (RHCP) panel antenna that transmits and receives signals in the 902-928 MHz frequency band. Alternatively, the radio antenna 150 can be arranged on or coupled to the door. For example, in the variation of the vending kit 100 described above in which the housing 120 defines a replacement door 122 for the kiosk, the radio antenna 150 can include a dipole antenna suspended from an interior surface of the replacement door 122 (e.g., on a frame of the replacement door 122) and substantially aligned (e.g., pointing toward) a particular shelf within the kiosk, such as shown in FIG. 5A. Similarly, the radio antenna 150 can mount onto an OEM door of the kiosk.

Figure 5B:
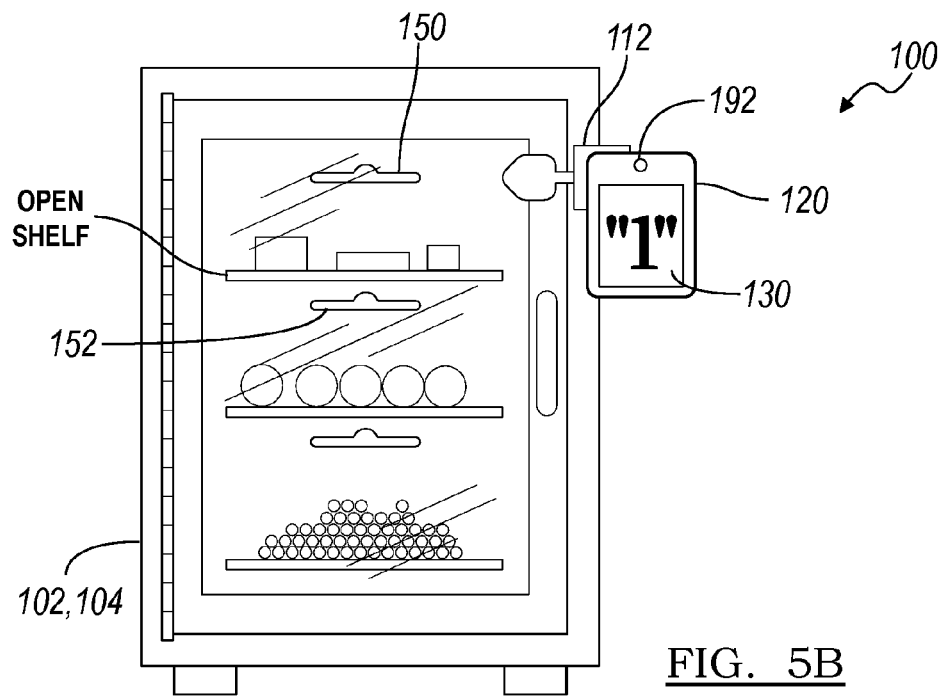

In the variation of the kiosk that includes multiple open shelves, the vending kit 100 can include multiple radio antennas, wherein each radio antenna is arranged on or adjacent one shelf of the vending machine 102 such as shown in FIG. 5B. For example, each shelf can be a metal (e.g., aluminum, stainless steel) shelf that blocks an electromagnetic power signal broadcast from other radio antenna(s) not arranged on, adjacent, or directly over the shelf. (Alternatively, the vending kit 100 can include metallic sheaths or films that can be arranged over shelves within the kiosk to shield electromagnetic radiation leaked between shelves.) Thus, in this example, one radio antenna can be arranged on, adjacent, or over a particular shelf to poll RFID tags on products arranged on the particular shelf. In this implementation, the vending kit 100 can thus include multiple radio antennas, with one or more radio antennas polling RFID tags on one particular shelf in the set of shelves within the vending machine 102. The RFID reader 160 can thus read RFID signals (i.e., RFID tag identification packets) received through multiple radio antennas. Alternatively, the vending kit 100 can include multiple RFID readers that similarly function to read wireless signals received from RFID tags through corresponding radio antenna(s).

The radio antenna 150 can additionally or alternatively poll RFID tags on items arranged across multiple shelves (e.g., stacked shelves). For example, each shelf can be of a polymer, a fibrous composite, or an other non-metallic and/or non-conducting material such that an electromagnetic power signal can be broadcast from the radio antenna 150 to the RFID tags on multiple shelves and such that data signals can be transmitted from the multiple RFID tags—through various shelves—back to the radio antenna 150.

In various use scenarios, a patron can remove an item from the vending machine 102 and consume the item, use the item, and/or dispense of the item packaging (including a corresponding RFID tag), etc. near the kiosk. Thus, the RFID reader 160 can poll local RFID tags through the radio antenna 150 at various (e.g., increasing) power levels, such as shown in FIGS. 2 and 3, and the processor 170 can estimate positions of items relative to the vending machine 102 based on radio antenna power levels required to receive a return signal from the corresponding RFID tags. In one example, the processor 170 cooperates with the RFID reader 160 and the radio antenna 150 to step up a power output of the radio antenna 150 and to correlate a minimum power level necessary to receive a returned signal from a particular RFID tag with a distance (or range of distances) between the radio antenna 150 and the particular RFID tag. In this example, the processor 170 can leverage a known dimension (e.g., depth, width, and/or height) of the vending machine 102, a state of the door, and/or an electromagnetic transparency of the door or kiosk case, etc. to determine if a particular item is currently within the vending machine 102 (e.g., on a shelf within the vending machine 102) or outside the vending machine 102 based on a requisite output power from the radio antenna 150 to receive a signal from the corresponding RFID tag.

In another example, the processor 170 compares a current radio antenna output power necessary to receive a signal from the particular RFID tag with a past RFID output power necessary to receive a signal from the particular RFID tag, correlates a minimal increase in requisite power with rearrangement of the item within the vending machine 102, and correlates a substantial increase in requisite power (e.g., greater than a absolute or proportional threshold increase in power) with removal of the respective item from the vending machine 102. The processor 170 can additionally or alternatively correlate requisite radio antenna output power to receive a signal from the RFID tag with arrangement of the corresponding item on a particular shelf and/or at a particular (estimated) distance from the radio antenna 150 within the vending machine 102.

Alternatively, the RFID reader 160 can collect a signal strength of returned communications from each RFID tag during a polling session, and the processor 170 can correlate each recorded signal strength with a distance of the corresponding item from the radio antenna 150. Thus, the processor 170 can cooperate with the radio antenna 150 and the RFID reader 160 to estimate positions of various items within the vending machine 102.

In one alternative configuration, the radio antenna 150 is arranged on the kiosk along a door jam such that, when the door is closed, the door blocks wireless communication between the radio antenna 150 and RFID tags on items stocked in the vending machine 102. However, in this configuration, when the door is opened, the radio antenna 150 can scan nearby RFID tags, and the RFID reader 160 and the processor 170 can read and analyze signals received through the radio antenna iso, respectively, to take inventory of items stocked within the vending machine 102. Thus, the processor 170 and the RFID reader 160 can poll RFID tags within the kiosk just at the door is opened and again just before the door closes. Alternatively, the processor 170 and the RFID reader 160 can poll RFID tags that move passed the door (i.e., as the corresponding products are removed from the vending machine 102).

In the foregoing implementations and configurations, once the door closes (i.e., shifts from open to closed) during a transaction with a customer, the processor 170 can update an inventory ledger and bill the patron based on a change in detected inventory between when the door was first opened and when the door was closed. However, the radio antenna 150 and the RFID reader 160 can function in any other way to collect identification information from one or more RFID tags arranged on corresponding items on one or more shelves within the vending machine 102 and/or outside but proximal the vending machine 102.

In the configuration described above in which the housing 120 is mounted on the door of the kiosk and the radio antenna 150 is arranged inside the kiosk, the radio antenna 150 can be electrically coupled to the RFID reader 160 via a cable routed through a frame of the door—such as from adjacent a door hinge—to the housing 120. In this implementation, the cable can include a coaxial line that communicates power to the radio antenna 150 to power RFID tags nearby and that communicates analog signals received from the RFID tags at the radio antenna 150 back to the RFID reader 160. The cable can further include a main power line that communicates power to the housing 120 to run the processor 170, the payment collection module 140, a wireless communication module 142, and/or the RFID reader 160, etc. within the housing 120. For example, the main power line can source power from a stock wall power line (e.g., 120 VAC) or a regulated power line (e.g., 20 VDC) within the kiosk and/or a backup battery arranged in the kiosk. However, the cable can include any other power or data line that communicates signals between components within the kiosk and components of the vending kit 100 arranged within the housing 120.

In one implementation, the housing 120 mounts the RFID reader 160 against a surface of the kiosk to conduct heat out of the RFID reader 160 and into the kiosk, thereby cooling the RFID reader 160. In one example, the housing 120 is installed over the outer surface of the door—such as at an upper corner of the door opposite a hinge—and the housing 120 can bind a heatsink surface of the RFID reader 160 against a casing of the door and/or against the door glass such that heat is conducted from the RFID reader 160 into the door. In this example, the RFID reader 160 mount to a conductive (e.g., copper) plate, and the conductive plate can be clamped, pressed, and/or adhered to an exterior surface of a glass section of the door to improve heat transfer between the RFID reader 160 and the door. In another example, the housing 120 mounts to the case of kiosk and bind a surface of the RFID reader 160 to the kiosk case to sink heat from the RFID reader 160 into the kiosk case. Yet alternatively, a surface of the RFID reader 160 can mate to the housing 120, and the housing 120 can conduct thermal energy from the RFID reader 160 into (a frame of) the door, into the kiosk case, or into the ambient environment. The vending kit 100 can also include a heat pipe, an active cooling system, and/or a graphene sheet or member through which thermal energy is conducted out of the RFID reader 160.

However, the vending kit 100 can include any other number of RFID readers and radio antennas, and the RFID reader(s) radio antenna(a), and the processor 170 can cooperate in any other way to poll and identify RFID tags arranged within the vending machine 102. The vending kit can additionally or alternatively include one or more RFID reader antennas that similarly function to power and then read signals received from radio frequency identification tags within the vending machine 102.

8. Additional Sensors

One variation of the kiosk includes an optical sensor (e.g., a camera) arranged inside the kiosk and configured to image a portion of a shelf supporting items. In this variation, the processor 170 can implement machine vision and/or machine learning techniques to identify items placed on the shelf, rearrangement of items placed on the shelf, and/or removal of items from the shelf. The processor 170 can thus cooperate with one or more optical sensors within the vending machine 102 to inventory stocked items in addition to or as an alternative to detection with the radio antenna 150 and the RFID reader 160. The processor 170 can additionally or alternatively store images—such as in memory on in the housing 120 or on a remote server—to maintain an archive of items sold through the vending machine 102 over time.

As shown in FIG. 1, one variation of the vending kit 100 further includes a scale 190 coupled to the shelf to detect a (total) weight of items placed on the shelf. For example, the scale 190 can include a strain gauge, an electronic balance scale, load cell, or a spring scale. In this variation, the processor 170 can compare outputs of the scale 190 before and after a transaction to verify that one or more products were removed from the shelf. Additionally or alternatively, the processor 170 can compare outputs of the scale 190 before and after a transaction to determine an amount of product removed from the shelf. For example, the processor 170 can cooperate with the radio antenna 150 to detect selection of a cold ham sandwich from the shelf. In this example, the patron can apply mustard from a mustard bottle—stored on another shelf within the vending machine 102—to the sandwich during the transaction, and the processor 170 can cooperate with the scale 190 to determine an amount of mustard that the patron applied to the sandwich. By applying RFID broadcast power and/or RFID return signal power as described above, the processor 170 can also determine that the patron selected the mustard bottle rather than an adjacent mayonnaise bottle and thus assign the change of weight of the second shelf to a change of weight of the mustard bottle—and therefore a change in volume of mustard in the mustard bottle. In this example, the processor 170 can track consumption of mustard from the mustard bottle over time based on reduction in sensed weight on the second shelf over time. Therefore, as in this example, the processor 170 can cooperate with the radio antenna 150, the RFID reader 160, the scale 190, and/or an optical sensor to determine both what item and how much of the item has been added to or removed from the vending machine 102. In another example in which fresh fruits are placed in the kiosk without applied RFID tags, the processor 170 can cooperate with the scale 190 to sense removal of a piece of fruit from the vending machine 102 independent of the RFID reader 160. However, the processor 170 can cooperate with one or more scales in addition to or as an alternative to the RFID reader 160, the radio antenna iso, and/or the optical sensor to detect the addition or removal of items to or from the vending machine 102.

The vending kit 100 can also include a temperature sensor arranged within the vending machine 102 to measure ambient temperature therein. The processor 170 can thus monitor the temperature of the environment within the vending machine 102 and transmit an alarm or notification to a vending machine manager to repair the vending machine 102 and/or to replace spoiled food items within the vending machine 102 if the detected vending machine temperature rises above a threshold temperature beyond a threshold period of time. The processor 170 can similarly monitor other functions of the vending machine 102 and transmit alarms or notifications to a vending machine manager if a malfunction is detected.

The vending kit 100 can further include a proximity sensor, and the processor can sample an output from the proximity sensor to determine that a potential patron is near the vending machine 102. When a potential patron is detected nearby, the processor can wake the display or otherwise respond to the patron.

9. Display

As shown in FIG. 1, one variation of the vending kit 100 includes a display arranged within the housing 120 and configured to display pricing information for products within the kiosk. Generally, the display 130 functions to render a user interface to guide a patron through a transaction at the vending machine 102. For example, the display 130 can default to rendering an instruction reciting "touch screen to begin" (e.g., for the display 130 that is a touchscreen) or "swipe credit card to begin." Thus, as the patron performs subsequent steps of a transaction, from providing a cashless payment mechanism to opening the door, selecting one or more items, and finally closing the door, the display 130 can render instructions for subsequent steps of the transaction.

The display 130 can also display pricing, nutrition, ingredient, source or supplier, allergy, and/or information for one or more items stocked within he vending machine 102, such as before or during a transaction. Furthermore, once the patron has made a selection from the vending machine 102 and closed the door, the processor 170 can calculate a total cost, total a nutritional value (e.g., calories, fat, ingredients), or aggregate another quantitative value of the patron's selection, and the display 130 can similarly render any one or more of these data. However, the display 130 can present any other useful or relevant information to a patron during a transaction. Pricing information for the products loaded into the kiosk can also be printed on product packaging and/or on labels applied to the products or product packaging.

10. Payment Collection Module

In the foregoing variation, the vending kit 100 can also include a payment collection module coupled to the housing 120, as shown in FIG. 1. Generally, the payment collection module 140 functions to collect, receive, authorize, and/or authenticate a payment method selected or entered by a patron to pay for an upcoming selection of items from the vending machine 102.

In one implementation, the payment collection module 140 includes a magnetic stripe reader that reads a magnetic stripe of a plastic card, such as a credit card, a debit card, or a plastic gift card. For example, the processor 170 can be coupled to a credit card reader via a ⅛" phone jack or via a USB port to collect credit card, debit card, or other plastic-type payment information from a patron. The payment collection module 140 can additionally or alternatively include a forward-facing camera, such as within the housing 120 adjacent the display 130, and the camera 192 can capture an image of a credit card, a debit card, a ID card or badge (e.g., a hospital ID card or an employee ID badge), or an other payment or identification method held before the camera 192, and the processor 170 can implement machine vision (e.g., optical character recognition) to extract relevant payment information from the image received from the camera 192. The camera 192 can similarly capture an image of a patron, and the processor 170 can implement facial recognition to identify the patron, automatically access a payment account linked to the patron, and bill the patron through the payment account based on the patron's product selection from the vending machine 102.

Alternatively, the processor 170 can maintain an inventory ledger of the contents of the kiosk and update the inventory ledger in response to a removed item and check items out to users as removed from the kiosk. In one example, the processor 170 can maintain an inventory ledger of contents of a janitorial closet "check-out" cleaning supplies for various janitors, and identify returns of cleaning supplies at the end of each janitorial shift.

11. Wireless Communication Module

As shown in FIG. 1, one variation of the vending kit 100 can therefore also include a wireless communication module 142.

In one implementation, the wireless communication module 142 communicates with a remote database, such as over Wi-Fi or cellular communication protocol. In this implementation, the payment collection module 140 can communicate with a computer network via the wireless communication module 142 to authenticate a transaction with a plastic card swiped by a patron. Once the transaction with the plastic card is authenticated, the processor 170 can trigger the locking mechanism 112 to unlock the door. Once the door is opened and then returned to closed, the processor 170 can trigger the locking mechanism 112 to lock the door and then poll the remaining RFID tags within the vending machine 102—via the RFID reader 160 and the radio antenna 150—and compares a previous inventory with the latest inventory to identify items selected by the patron. The processor 170 can then retrieve a price for each of the selected items—such as from data coded into each RFID tagged, from data stored locally in memory in the vending machine 102, or from data received from a remote database—sum the current prices for the selected items, and bill the authenticated payment mechanism accordingly. For example, the processor 170 can cooperate with the wireless communication module 142 to access a remote database of RFID serial numbers and related product details, and the processor 170 can pass a disjoint of a previous set of RFID tag serial numbers and a current set of RFID tag serial numbers to the remote database to collect corresponding real-time prices for the items selected by the patron. Alternatively, the processor 170 cooperates with the wireless communication module 142 to transmit payment and inventory data to the remote server, including an initial inventory and a final inventory for a current transaction, and the remote server can determine which items were removed from the vending machine 102 and bill the patron accordingly through the supplied payment. The processor 170 can thus cooperate with a remote server or computer network to identify items removed from the vending machine 102 and to bill the patron accordingly.

In this implementation, the processor 170 can cooperate with the wireless communication module 142 to transmit (e.g., push) triggers or notifications to restock one or more items into the vending machine 102 to associated vendors, such as in response to a vending machine 102 inventory dropping below a general or item type-specific threshold. For example, the processor 170 can interface with the wireless communication module 142 to transmit a restocking request to a particular vendor based on a final inventory in the vending machine 102 after completion of a transaction.

In another implementation, the wireless communication module 142 identifies a mobile computing device proximal the vending machine 102, and the processor 170 can communicate with the mobile computing device through the payment collection module 140 to authenticate a cashless payment mechanism associated with the mobile computing device. Once the transaction is complete, the processor 170 can then transmit a receipt for payment to the mobile computing device through the short-range wireless communication module 142. For example, the wireless communication module 142 can transmit the digital receipt (and/or product pricing information, payment information, nutritional information, etc.) directly to the mobile computing device, such as over short-range wireless communication protocol (e.g., Bluetooth), or the wireless communication module 142 can transmit the digital receipt (and/or other transaction-related information.) to a computer network—such as over cellular or Wi-Fi communication protocol—and the computer network can route the receipt (and other information) to the mobile computing device, such as over a cellular network.

In a similar implementation, the wireless communication module 142 transmits foodstuff data to a mobile computing device proximal the vending machine 102 for presentation to a patron. Generally, in this implementation, the vending kit 100 leverages an interface on a patron's mobile computing device (e.g., a smartphone, a tablet) near the vending machine 102 to visually guide the patron through a transaction, to display inventory and foodstuff information, to collect payment information, and/or to complete the transaction by transmitting visual transaction-related data to—and receiving patron selection input into—the mobile computing device via the wireless communication module 142. For example, the wireless communication module 142 can transmit transaction instructions, pricing, nutritional, and/or ingredient information for foodstuffs stocked in the vending machine 102 to the patron's smartphone (or tablet), and the smartphone can execute a native vending transaction application to render these data on the display 130 within the smartphone, thereby guiding the user through the transaction with the vending machine 102. In this example, the wireless communication module 142 can then receive a cashless payment mechanism selection (e.g., for a stored credit card, an electronic payment platform, or a gift card) made by the patron through the native vending application on the smartphone, the wireless communication module 142 can transmit a receipt for one or more foodstuffs selected from the vending machine 102 by the patron back to the smartphone, and the native vending application can display the receipt for the patron, thereby indicating completion of the transaction.

Thus, in this and the foregoing implementations, the wireless communication module 142 can communicate with the patron's mobile computing device via short-range wireless communication protocol, such as near-field communication (NFC) or Bluetooth, or any other suitable type of wireless communication.

12. Processor

The processor 170 of the vending kit 100 can be arranged within the housing 120 and records an initial inventory of products within the kiosk based on signals read by the radio frequency identification reader 160, to authenticate a cashless payment mechanism received at the payment collection module 140, to trigger the locking mechanism 112 to unlock the door in response to authentication of the cashless payment mechanism, to record a final inventory of products within the kiosk based on signals read by the radio frequency identification reader 160 in response to closure of the door detected at the door sensor 110, and to initiate a payment with the cashless payment mechanism for a difference between the initial inventory and the final inventory. Thus, when the vending kit 100 is in operation, the processor 170 can record an initial inventory of products within the kiosk based on signals read by the radio frequency identification reader 160, initiate—through the wireless communication module 142—a transaction with a cashless payment mechanism associated with the mobile computing device, trigger the locking mechanism 112 unlock the locking mechanism 112 in response to initiation of the transaction, record a final inventory of products within the kiosk based on signals read by the radio frequency identification reader 160 in response to closure of the door detected at the door sensor 110, and initiate a payment with the cashless payment mechanism for a difference between the initial inventory and the final inventory. Generally, the processor 170 cooperates with the locking mechanism 112 to control access to items stocked it the vending machine 102, cooperates with the RFID reader 160 and the radio antenna 150 (and the scale 190, and the optical sensor) to identify removal of an one or more items from the vending machine 102, and cooperates with the door sensor 110, the payment collection module 140, and/or the wireless communication module 142 to electronically bill a patron for the removed items in response to detected closure of the door.

Figure 4:
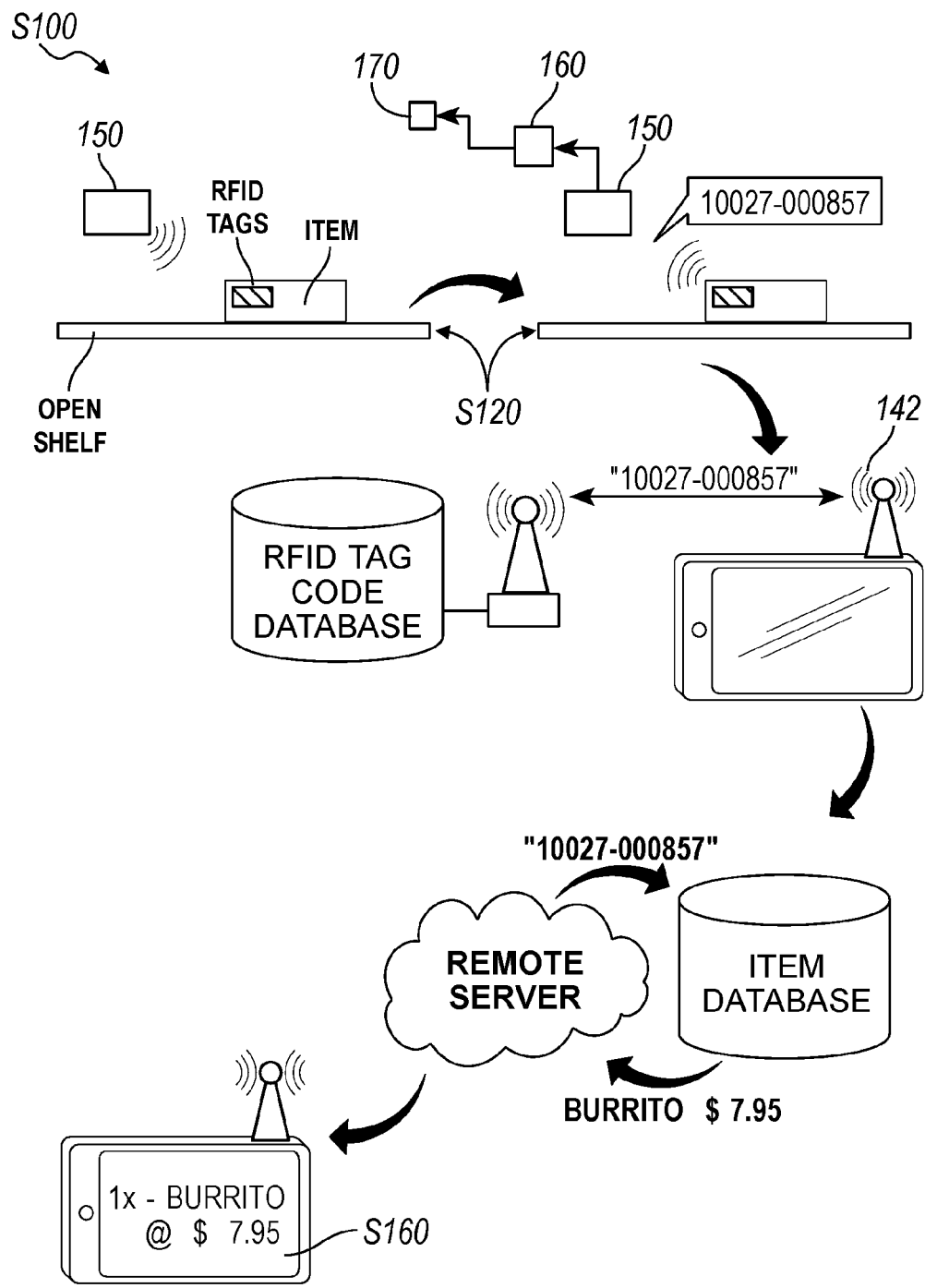
FIG. 4 is a flowchart representation of one variation of the method.

In one example implementation shown in FIGS. 3 and 4, the processor 170 executes the following to complete a transaction with a patron: With the locking mechanism 112 in a locked state, the processor 170 takes initial inventory of the vending machine 102 by polling the RFID reader 160 and the radio antenna 150 and identifying items stocked in the vending machine 102 by matching received codes with RFID tag data stored locally and/or on a remote database. When recording the initial vending machine 102 inventory, the processor 170 can also read an output of the scale 190 to determine a weight of contents in the vending machine 102, such as on particular shelves within the vending machine 102. For example, this initial inventory recorded by the processor 170 can coincide with a final inventory recorded during a preceding transaction completed at the vending machine 102. Alternatively, the initial inventory can be recorded by the processor 170 at a regular interval (e.g., every five minutes) or when a patron initiates a transaction (e.g., by touching the display 130 or presenting a cashless payment mechanism). When a patron then approaches the vending machine 102 to make a transaction, the display 130 prompts the patron to enter a cashless payment mechanism, the payment collection module 140 receives a cashless payment mechanism entered by the patron, and processor validates (e.g., authenticates, authorizes) the cashless payment mechanism associated with the patron. For example and as described above, the processor 170 can cooperate with the payment collection module 140 to receive credit card data swiped by the patron, to access an electronic payment account with a username and password entered by the patron, or to implement facial recognition techniques to identify the patron adjacent the vending machine 102 and then access a corresponding electronic payment account. Once a valid payment mechanism (e.g., a payment account) is identified and the initial inventory is recorded, the processor 170 triggers the locking mechanism 112 to unlock the door.

In the foregoing example implementation, the patron opens the door to collect his desired item(s). Once his selection is complete, the patron closes the door, which is sensed by the door sensor no and prompts the processor 170 to trigger the locking mechanism 112 to again lock the door. Alternatively, once the payment method is authenticated and the transaction initiated, the processor 170 can trigger the locking mechanism 112 to unlock the door for a preset period of time, such as five seconds. After this period of time expires, the processor 170 can trigger the locking mechanism 112 to again enter a lock state such that, when patron closes the door, the locking mechanism 112 retains the door closed, and the door sensor 110 can confirm that the door is closed and locked. Similarly, once the payment method is authenticated and the transaction initiated, the processor 170 can trigger the locking mechanism 112 to unlock the door. Once an accelerometer, position sensor, or other sensor coupled to the door or to the casing of the vending machine 102 detects that the door has moved (i.e., opened), the processor 170 can trigger the locking mechanism 112 to again enter the lock state such that, when patron closes the door, the locking mechanism 112 retains the door closed.

The processor 170 then polls the RFID reader 160 and the radio antenna 150 (and the weight sensor, and the optical sensor) to record a new (i.e., final) inventory in the vending machine 102. The processor 170 identifies what items and/or how much of one or more items were removed from the vending machine 102 by comparing the initial inventory with the new inventory. The processor 170 thus polls relevant sensors in the vending machine 102 to identify a transaction basket defined by a difference between the initial and final vending machine 102 inventories and then accesses a local or remote database of current prices for items in the transaction basket. For example, the processor 170 can calculate a disjoint of the set of RFID tag serial numbers in the initial inventory and the set of RFID tag serial numbers in the final inventory, transmit this disjoint set of RFID tag serial numbers to a remote database via the wireless communication module 142, and receive a set of real-time prices for the items in the transaction bucket. The processor 170 tallies the cost of the items selected by the patron and finally initiates a payment from the cashless payment mechanism for the transaction bucket. For example, the processor 170 can cooperate with the wireless communication module 142 to transmit a receipt for the transaction to a remote server that handles credit card payments between the patron's credit card account and a holding account associated with the vending machine 102. In another example, the processor 170 can communicate with the remote server indirectly, such as by routing payment details to the remote server through the patron's mobile computing device (e.g., smartphone, tablet). As described above, the processor 170 can also transmit transaction data, such as total cost, a list of selected items, or total selection nutrition content, to the mobile computing device for presentation to the patron.

The processor 170 can additionally or alternatively poll relevant sensors while the door is open, determine what items have been removed from a shelf in the vending machine 102, and populate the transaction basket in real time. The processor 170 can also update the display 130 with a list of items in the transaction basket, an itemized cost of the selection(s), and/or a total cost of the patron's selection. The processor 170 can also track item purchases by the patron over time, including what the patron purchases, when a patron purchases particular items from the vending machine 102, what items the patron purchases together or separately, how the patron prepares a certain item (e.g., by adding mustard on a ham sandwich and mayonnaise on a tomato sandwich), etc. The processor 170 can store such patron information locally and/or transmit these patron data to a remote server.

The processor 170 can thus cooperate with various components of the vending kit 100 (and the kiosk) to execute method S100 described below. However, the processor 170 can function in any other way to control access to items within the vending machine 102 and to complete a transaction with a patron.

13. Battery

As shown in FIG. 1, one variation of the vending kit 100 includes a backup battery 180. Generally, the backup battery 180 can function to supply power to various components of the vending kit 100—such as the locking mechanism 112, the processor 170, and the wireless communication module 142—during a power outage at the vending machine 102. For example, in response to a loss of wall power (e.g., 120 VAC) to the vending machine 102, the processor 170 can source power from the backup battery 180 and transmit details of a current inventory of items (e.g., foodstuffs) within the vending machine 102 to the computer network via the wireless communication module 142. In another example, the backup battery 180 can supply power to the locking mechanism 112 during a power outage to secure the current inventory in the vending machine 102. In this example, the backup battery 180 can also power the wireless communication module 142 and/or the display 130 such that an authorized user (e.g., a vending machine 102 serviceman or a vendor) can enter an unlock command into the vending machine 102 via the wireless communication or via the display 130. In this example, the processor 170 can handle the unlock command by triggering the locking mechanism 112 to unlock the door, thereby providing the user with access to items within the vending machine 102, such as to replace expired items or to remove items for alternative storage (e.g., alternative refrigeration). Alternatively, for the vending machine 102 stocked with foodstuffs (or other items) not substantially susceptible to spoilage in higher (e.g., room) or lower (e.g., subofreezing) temperatures, the backup battery 180 can provide power to the processor 170 and other components of the vending machine 102 to maintain full vending operation of the vending machine 102. However, the backup battery 180 can function in any other way to power one or more components of the vending kit 100 during a power outage or power shortage.

14. Installation Kit

One variation of the vending kit 100 further includes an installation kit to enable quick installation of the housing 120 and other components of the vending kit 100 onto a kiosk, such as in fewer than fifteen minutes. For example, the installation kit can include a jig to support the lock receiver adjacent the kiosk and in alignment with the locking mechanism 112 during installation, such as during installation of self-tapping sheet metal through the kiosk and the lock receiver or while an adhesive sets between the kiosk and an exterior surface of the kiosk. The jig can thus ensure proper alignment of the kiosk and the locking mechanism 112 and the lock receiver such that, when the processor 170 of the kiosk triggers the locking mechanism 112 to lock, the locking mechanism 112 can drive a bolt into the lock receiver to lock the door in a closed position, as described above and shown in FIG. 5A. However, the installation kit can function in any other way to support or aid installation of the vending kit 100 onto the kiosk.

15. Method

As described above, the vending kit 100 implements a method S100 for controlling access to products from a vending machine 102. As shown in FIGS. 3 and 4, method S100 can therefore include: locking a door of the vending machine 102 in Block Silo; recording an initial inventory of products arranged within the vending machine 102 based on signals received by a radio antenna arranged within the vending machine 102 and read by a radio frequency identification reader 160 in Block S120; initiating a transaction in response to receiving a cashless payment mechanism from a patron in Block S130; unlocking the door in response to authentication of the cashless payment mechanism in Block S140; in response to closure of the door, recording a final inventory of products within the vending machine 102 based on signals received by the radio antenna 150 and read by the radio frequency identification reader 160 in Block S150; and initiating a payment with the cashless payment mechanism for a difference between the initial inventory and the final inventory to complete the transaction in Block S160.

Block Silo of method S100 recites locking a door of the vending machine 102. Generally, Block S110 functions to maintain the vending machine 102 in a locked state to secure items stored within until a new transaction is initiated with a valid payment mechanism supplied by a patron (or until a vendor unlocks the door to stock new items into the vending machine 102). Thus, once a first patron closes the door of the vending machine 102 after making an item selection, Block S110 (executed by the processor 170 can trigger the locking mechanism 112 to lock the door of the vending machine 102 until a second patron later approaches the vending machine 102 and furnishes a valid payment mechanism, such as by swiping a credit card or tapping an NFC-enabled smartphone on a NFC reader in the vending machine 102.

Block S120 of method S100 recites recording an initial inventory of products arranged within the vending machine 102 based on signals received by a radio antenna arranged within the vending machine 102 and read by a radio frequency identification reader 160. Generally, Block S120 functions to inventory a stock of items in the vending machine 102 before the door is unlocked for a new patron by polling RFID tags in the vending machine 102 with the RFID reader 160 and the radio antenna 150. In one implementation, Block S120 functions (like Block S150 described below) to record a final inventory in the vending machine 102 after a first patron closes the door during a first transaction, and Block S120 stores this final inventory. In this example, when a second patron later initiates a new transaction, Block S120 sets the previous final inventory as the initial inventory for the new transaction. Alternatively, once a patron supplies a cashless payment mechanism to initiate a transaction, Block S120 can record the initial vending machine 102 inventory by polling RFID tags on stocked items just before Block S140 unlocks the door. However, Block S120 can function in any other way to record an initial inventory of items stocked in the vending machine 102 before a patron is provided access to the items.

Block S130 of method S100 recites initiating a transaction in response to receiving a cashless payment mechanism from a patron. Generally, Block S130 functions to initiate a transaction with a patron, such as by receiving, authorizing, authenticating, and/or validating a cashless payment mechanism supplied by or associated with the patron. In one example, Block S130 receives payment information from a credit card swiped through a magnetic stripe reader coupled to (e.g., integrated into) the vending machine 102 and interfaces with a remote payments server to authenticate subsequent payment with the credit card. In another example, Block S130 detects a mobile computing device (e.g., a smartphone, a tablet) proximal the vending machine 102 and collects—from the mobile computing device—a cashless payment mechanism associated with the mobile computing device. In this example, Block S130 can also transmit pricing data for items (e.g., foodstuffs) in the vending machine 102—such as based on the initial inventory recorded in Block S120—to the mobile computing device for presentation to the patron. However, Block S130 can function in any other way to initiate a transaction with a patron and/or to validate a supplied payment mechanism.

Block S140 of method S100 recites unlocking the door in response to authentication of the cashless payment mechanism. Generally, Block S140 functions to provide a patron with access to stocked items in the vending machine 102 by triggering the locking mechanism 112 to unlock the door in response to validation of a transaction with the patron (e.g., in response to authentication of a cashless payment mechanism in Block S130).

Block S150 of method S100 recites, in response to closure of the door, recording a final inventory of products within the vending machine 102 based on signals received by the radio antenna 150 and read by the radio frequency identification reader 160. Generally, Block S150 functions to trigger the locking mechanism 112 to again lock the door once the patron has returned the door to the closed position (e.g., as detected by the door sensor 110) and then interfaces with the RFID reader 160 and the radio antenna 150 to record a final inventory of items in the vending machine 102. Alternatively, Block S150 can shift the locking mechanism 112 into a lock state while the door is open during a transaction such that the locking mechanism 112 is armed to lock the door once the patron returns the door to the closed position, and Block S150 can then interface with the RFID reader 160 and the radio antenna 150 (or an RFID antenna) to record the final inventory of items within the vending machine 102.

Block S160 of method S100 recites initiating a payment with the cashless payment mechanism for a difference between the initial inventory and the final inventory to complete the transaction. Generally, Block S160 functions to identify items selected by the patron by comparing RFID codes recorded in the initial inventory and RFID codes recorded in the final inventory and then bills the patron for the selected items. For example, Block S160 can identify a particular product removed from the vending machine 102 by the patron based on a difference between the initial inventory and the final inventory and then initiate a payment for the price of the particular product through the credit card supplied by the patron. Block S160 can also transmit a receipt for the transaction to the patron's mobile computing device, and a native vending transaction application executing on the patron's mobile computing device can display (i.e., visually present) these transaction data to the patron.

However, method S100 can function in any other way to control access to items within a vending machine 102 and to bill a patron for selection of one or more of the items.

The vending kit 100, vending machine 102, and related methods can be embodied and/or implemented at least in part as a machine configured to receive a computer-readable medium storing computer-readable instructions. The instructions can be executed by computer-executable components integrated with the vehicle, scheduling kiosk(s), a remote scheduling server, hardware/firmware/software elements of a patron computer or mobile device, or any suitable combination thereof. Other systems and methods of the invention can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A vending system for controlling access to products from a vending machine, the vending system comprising:
   a locking mechanism arranged between a door of a kiosk and a casing of the kiosk;
   a door sensor;
   a payment collection module;
   a radio antenna arranged within the kiosk and configured to broadcast an excitation signal toward radio frequency identification tags arranged on products within the kiosk;
   a radio frequency identification reader arranged within the kiosk configured to read identification signals received from radio frequency identification tags via the radio antenna; and
   a processor arranged within the kiosk and configured:
      to record an initial inventory of products within the kiosk based on signals received by the radio frequency identification reader,
      to collect payment information from a patron through the payment collection module,
      to initiate a new transaction at the kiosk in response to authentication of the payment information,
      to trigger the locking mechanism to unlock the door in response to initialization of the new transaction,
      to record a final inventory of products within the kiosk based on signals received by the radio frequency identification reader in response to opening of the door followed by closure of the door, as detected by the door sensor, during the new transaction, and
      to initiate a payment for a difference between the initial inventory and the final inventory via the payment information to complete the new transactions;
      to estimate a first position of a first product on a first shelf within the kiosk prior to the new transaction based on strength of a first signal received from a first radio frequency identification tag, arranged on the first product, by the radio antenna; and
      to estimate a second position of the first product on the first shelf within the kiosk upon conclusion of the new transaction based on strength of a second signal received from the first radio frequency identification tag by the radio antenna.

2. The vending system of claim 1, wherein the kiosk comprises a column of vertically-offset open shelves arranged behind the door of the kiosk, wherein each shelf in the column of shelves is configured to accommodate a group of food products packaged in multiple unique form factors.

3. The vending system of claim 2:
   further comprising:
      a housing mounted to the door of the kiosk; and
      a display arranged within the housing;
   wherein the radio frequency identification reader is arranged within the housing; and
   wherein the radio antenna is arranged over a first shelf, in the column of shelves, and is electrically coupled to the radio frequency identification reader via a cable passing from a body of the kiosk, through the door, to the housing.

4. The vending system of claim 3, wherein the housing is configured to conduct thermal energy from the radio frequency identification reader into a frame of the door.

5. The vending system of claim 3:
   wherein the radio antenna is configured to excite radio frequency identification tags arranged on products placed on the first shelf;
   further comprising a second radio antenna arranged over a second shelf in the column of shelves and configured to output an excitation signal to excite radio frequency identification tags arranged on products placed on the second shelf; and
   wherein the processor is configured to record the initial inventory of products within the kiosk based on signals received from the radio antenna and the second radio antenna by the radio frequency identification reader.

6. The vending system of claim 3, wherein the door lock, the door sensor, the radio antenna, and the housing comprise a vending kit configured for retrofitting onto an existing kiosk.

7. The vending system of claim 6:
   wherein the housing comprises a replacement door for the kiosk;
   wherein the locking mechanism comprises a lock bolt integrated into the replacement door;
   wherein the door sensor is integrated into the replacement door; and
   wherein the radio antenna comprises a dipole antenna arranged along the frame of the replacement door.

8. The vending system of claim 2:
   further comprising a first radio frequency identification tag arranged on a first shelf, in the column of shelves, over a first region of the first shelf designated for a first product type comprising a metallic packaging; and wherein the processor is further configured:
to determine that a unit of the first product type is in inventory in the kiosk and arranged over the first region of the first shelf in response to a scan of the first shelf by the radio frequency identification reader that excludes a signal associated with the first radio frequency identification; and
to determine that a unit of the first product type has been removed from the first region of the first shelf in response to a scan of the first shelf by the radio frequency identification reader that comprises a signal associated with the first radio frequency identification tag.

9. The vending system of claim 1:
wherein the payment collection module comprises a wireless communication module configured:
to detect a mobile computing device proximal the kiosk;
to download payment information from the mobile computing device;
wherein the processor is further configured to generate a digital receipt based on the difference between the initial inventory and the final inventory in response to conclusion of the new transaction; and
wherein the payment collection module is further configured to wirelessly transmit the digital receipt to the mobile computing device.

10. The vending system of claim 9:
wherein the processor is further configured to access product information and real-time pricing data of products stocked in the kiosk based on identification signals received from radio frequency identification tags via the radio antenna prior to the new transaction; and
wherein the wireless communication module is further configured to transmit product information and real-time pricing data of products stocked in the kiosk to the mobile computing device for visual review at the mobile computing device in response to initialization initiation of the new transaction.

11. The vending system of claim 1:
wherein the processor is further configured to access real-time pricing data of products stocked in the kiosk based on identification signals received from radio frequency identification tags via the radio antenna prior to the new transaction; and
further comprising a display arranged on the kiosk and configured to display pricing information of products stocked within the kiosk during the new transaction.

12. The vending system of claim 11:
wherein the processor is further configured:
to identify a set of products removed from the kiosk during the new transaction based on the difference between the initial inventory and the final inventory;
to access nutritional information for each product in the set of products based on identities of products in the set of products; and
to calculate aggregate nutritional information of the set of products; and
wherein the display is further configured to display the aggregate nutritional information of the set of products in response to conclusion of the new transaction.

13. The vending system of claim 1, wherein the processor is configured:
to detect the door in an open state, following triggering of the locking mechanism to unlock the door, at a first time based on a first change in an output of the door sensor;
to detect closure of the door, following opening of the door, based on a second change in an output of the door sensor at a second time succeeding the first time;
to trigger the locking mechanism to lock the door in response to detecting closure of the door at a third time succeeding the second time;
to trigger the radio frequency identification reader to scan contents of the kiosk for remaining radio frequency identification tags in response to the locking mechanism re-locking the door at a fourth time succeeding the third time; and
to record the final inventory of products within the kiosk based on signals received by the radio frequency identification reader at a fifth time succeeding the fourth time.

14. The vending system of claim 1, wherein the processor is further configured:
to store the final inventory of products within the kiosk following completion of the new transaction at a first time;
to collect a second payment method from a second patron through the payment collection module at a second time;
to initiate a next transaction at the kiosk in response to authentication of the second payment method;
to trigger the locking mechanism to unlock the door in response to initialization of the next transaction;
to record a second final inventory of products within the kiosk based on signals received by the radio frequency identification reader in response to opening of the door followed by closure of the door, as detected by the door sensor, during the next transaction; and
to initiate a payment for a difference between the final inventory and the second final inventory via the second payment method to complete the next transaction.

15. The vending system of claim 1:
further comprising a first radio frequency identification tag configured:
for arrangement across a packaging of a first product stocked within the kiosk;
to tear in response to separation of the first radio frequency identification tag from the packaging of the first product; and
to broadcast a first unique identifier in response to receipt of an excitation signal;
wherein the processor is configured to confirm placement of the first product within the kiosk in response to receipt of the first unique identifier at the radio frequency identification reader.

16. A vending system for controlling access to products from a vending machine, the vending system comprising:
a locking mechanism arranged between a door of a kiosk and a casing of the kiosk;
a door sensor;
a payment collection module;
a radio antenna arranged within the kiosk and configured to broadcast an excitation signal toward radio frequency identification tags arranged on products within the kiosk;
a radio frequency identification reader arranged within the kiosk configured to read identification signals received from radio frequency identification tags via the radio antenna; and
a processor arranged within the kiosk and configured:
to record an initial inventory of products within the kiosk based on signals received by the radio frequency identification reader;

to collect payment information from a patron through the payment collection module;

to initiate a new transaction at the kiosk in response to authentication of the payment information;

to trigger the locking mechanism to unlock the door in response to initialization of the new transaction;

to record a final inventory of products within the kiosk based on signals received by the radio frequency identification reader in response to opening of the door followed by closure of the door, as detected by the door sensor, during the new transaction;

to initiate a payment for a difference between the initial inventory and the final inventory via the payment information to complete the new transaction;

to access real-time pricing data of products stocked in the kiosk based on identification signals received from radio frequency identification tags via the radio antenna prior to the new transaction;

to identify a set of products removed from the kiosk during the new transaction based on the difference between the initial inventory and the final inventory; and to access nutritional information for each product in the set of products based on identities of products in the set of products; and to calculate aggregate nutritional information of the set of products; and a display arranged on the kiosk and configured to display pricing information of products stocked within the kiosk during the new transaction and the aggregate nutritional information of the set of products in response to conclusion of the new transaction.

* * * * *